United States Patent

Hoffman et al.

Patent Number: 5,163,505
Date of Patent: Nov. 17, 1992

[54] HEATER CORE RETAINING SYSTEM

[75] Inventors: Donald E. Hoffman, Java Center; Frank C. Falzone, Cheektowaga, both of N.Y.

[73] Assignee: General Motors Corporation, Detroit, Mich.

[21] Appl. No.: 858,468

[22] Filed: Mar. 27, 1992

[51] Int. Cl.⁵ .................................... F28F 9/00
[52] U.S. Cl. ................................ 165/67; 180/68.4; 292/19; 248/505
[58] Field of Search .................... 165/67; 180/68.4; 292/19; 248/500, 505, 510

[56] References Cited

U.S. PATENT DOCUMENTS

| | | | |
|---|---|---|---|
| 373,248 | 11/1887 | Palmer | 292/19 |
| 3,008,400 | 11/1961 | Barényi | 180/68.4 X |
| 3,395,753 | 8/1968 | Falso | 165/67 |
| 3,700,061 | 10/1972 | Hortnagl | 180/68 R |
| 3,894,580 | 7/1975 | Chartet | 165/67 |
| 4,220,198 | 9/1980 | Jennings et al. | 165/67 |
| 4,367,572 | 1/1983 | Zielenski | 24/301 |
| 4,417,635 | 11/1983 | Thepault | 180/68 R |
| 4,773,496 | 9/1988 | Brielmair | 180/68.4 |
| 4,862,953 | 9/1989 | Granetzke et al. | 165/67 |

FOREIGN PATENT DOCUMENTS

| | | |
|---|---|---|
| 2018457 | 4/1970 | Fed. Rep. of Germany . |
| 2018459 | 4/1970 | Fed. Rep. of Germany . |
| 3814007 | 4/1989 | Fed. Rep. of Germany . |
| 1300273 | 6/1962 | France . |

*Primary Examiner*—Allen J. Flanigan
*Attorney, Agent, or Firm*—Ronald L. Phillips

[57] ABSTRACT

A heater core is mounted over an opening in a wall of a heater and air conditioner case and secured by a single spring steel strap having a straight portion extending parallel to the tubes of the core and bearing on the header flanges. The strap has terminal hook portions which engage anchor apertures in the web outboard of the core. The apertures have flanged edges for engagement by the hook portions and the strap is manually flexed for engagement or disengagement of the hook portions during installation or removal of the strap so that no tools are required. One embodiment has a hook on one end of the strap and a snap fastener on the other end. Another embodiment has identical hooks on both ends of the strap.

8 Claims, 2 Drawing Sheets

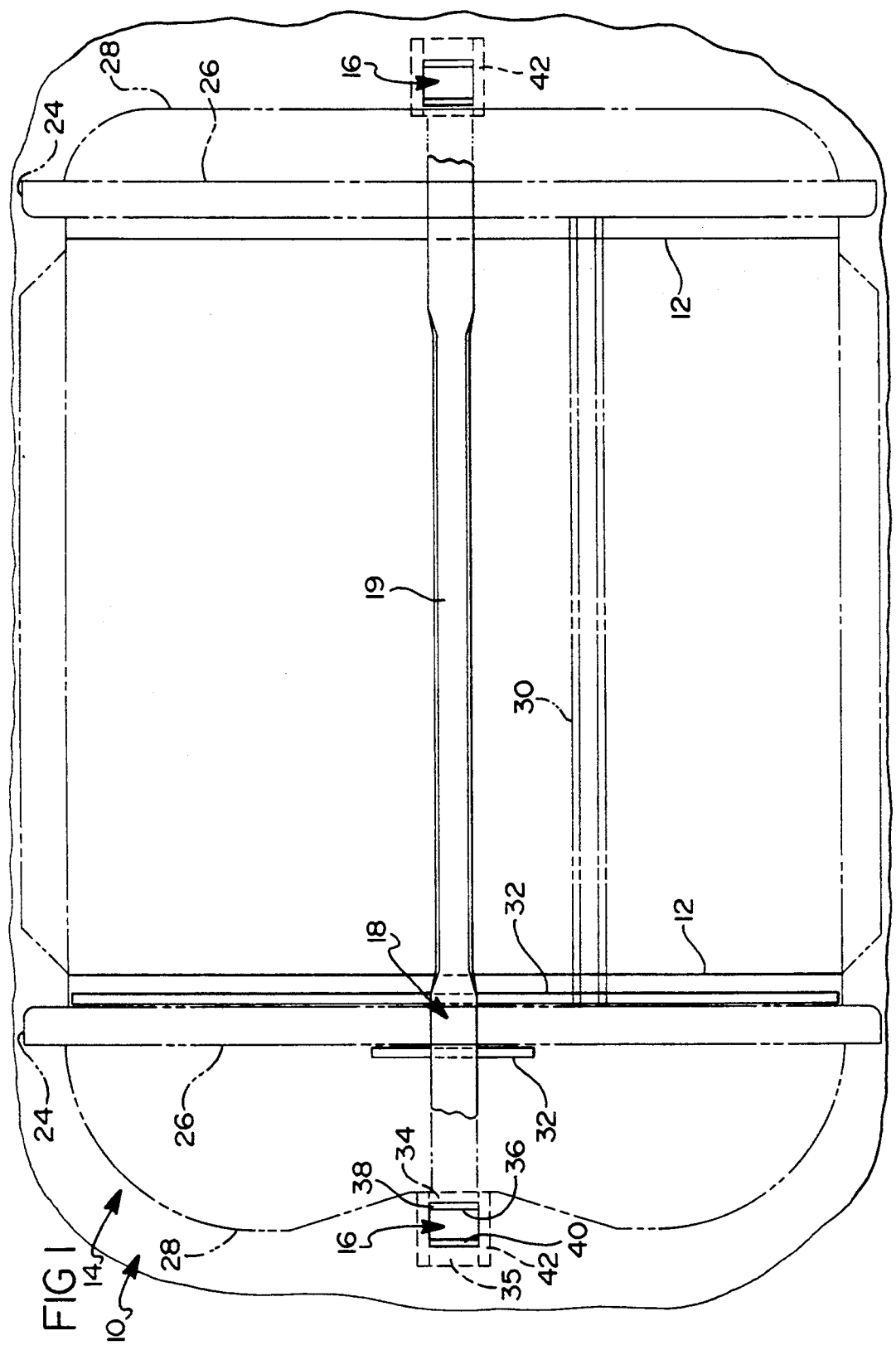

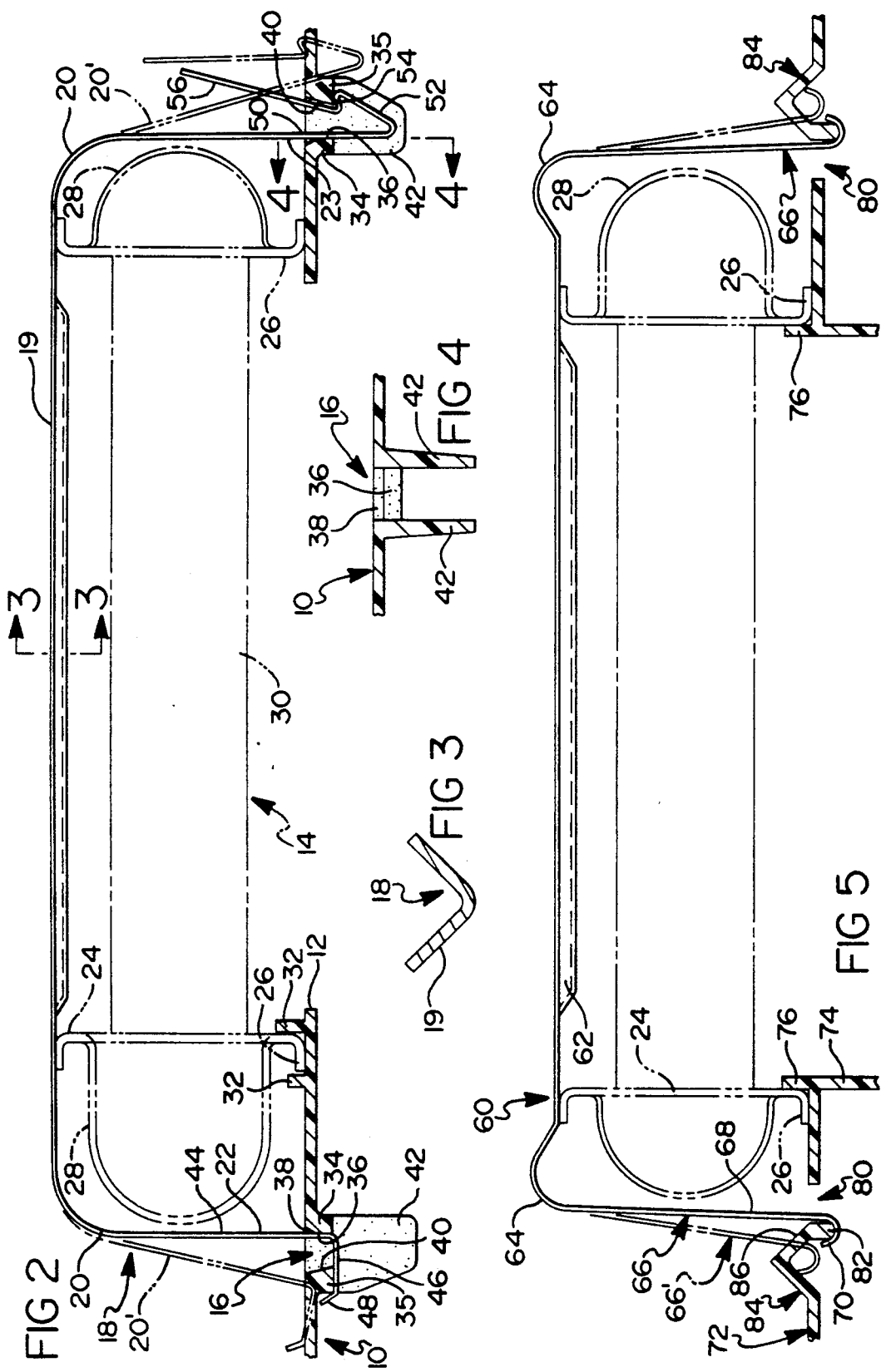

HEATER CORE RETAINING SYSTEM

FIELD OF THE INVENTION

This invention relates to apparatus in an air conditioning or heating system for securing a heater core to a case and particularly to a mounting strap and an attachment of the strap to the case.

BACKGROUND OF THE INVENTION

In an air conditioning and heating system for vehicles it is a common practice to secure a heater core in a case such that the core covers an air flow passage. The core comprises a pair of spaced headers or tanks and a plurality of parallel flat heat exchange tubes connecting the headers. One known mounting arrangement utilizes two spring steel straps extending transverse to the tubes and screws at the ends for attaching the straps to the case. Thus six parts are used to hold the core to the case. During installation or subsequent servicing the six parts must be handled, one at a time. Also, during installation or servicing, a screw may be dropped in the case thus requiring a retrieval operation.

SUMMARY OF THE INVENTION

It is therefore an object of the invention to provide a simpler attachment means for the heater core, especially to reduce the number of attaching parts and to eliminate fasteners such as screws. It is another object to provide such an attachment arrangement which requires no tools for installation or removal.

The invention is carried out in an air conditioning and heating system by apparatus for mounting a heater core comprising: a web for supporting a heater core, the web defining a passage for air flow through the core and further defining a pair of anchor means on opposite side of the passage; and an elongated spring steel strap secured to the anchor means for spanning the heater core and holding the heater core against the web, the strap having on each end a flexed arcuate portion terminating in hook means for engaging the anchor means, whereby the flexed arcuate portions urge the strap against the heater core.

BRIEF DESCRIPTION OF THE DRAWINGS

The above and other advantages of the invention will become more apparent from the following description taken in conjunction with the accompanying drawings wherein like references refer to like parts and wherein:

FIGS. 1 and 2 are a plan view and a side view, respectively, of a heater core, mounting case and mounting strap according to the invention;

FIG. 3 is a cross section through the strap taken along lines 3—3 of FIG. 2;

FIG. 4 is a cross section of the mounting case taken along line 4—4 of FIG. 2; and FIG. 5 is a side view of a heater core, mounting case and mounting strap according to a second embodiment of the invention.

DESCRIPTION OF THE INVENTION

While the heater core in the ensuing description may be mounted in a case in any attitude, for ease and clarity of explanation it is described as if it were mounted to the upper surface of a horizontal web or wall.

Referring to FIGS. 1-4 of the drawings, a wall or web 10 of a case for air conditioning and heater heat exchangers has a large opening 12 for the passage of an air stream to be heated, and a heater core 14 is mounted on one side (herein called the "upper side") of the web 10 over the opening so that the air stream passes through the core. Anchor apertures 16 in the web 10 are located on opposite side of the opening 12 outboard of and adjacent to the core 14. A spring steel mounting strap 18 has a straight middle section 19 which extends over the core 14, a curved flexed section 20 at each end of the straight section 19 extending toward the web 10, and end portions 22 and 23 which engage the anchor apertures. The straight middle section 19 of the strap is rigid due to a V-shaped cross section as shown in FIG. 3. The flexed sections 20 have a free position as shown by the phantom line 20' of greater radius of curvature than that present in the installed or flexed condition, so that when installed the end portions are biased upward against the under side of the webs and the straight section of the strap pushes down on the core 14.

The core 14 is of conventional design and comprises a pair of headers 24 having side flanges 26, a reservoir or tank 28 secured to each header, and a plurality of parallel flat heat exchanger tubes 30 extending between the headers to carry heated fluid from one tank 28 to the other. At the lower side of the core the flanges 26 of the headers 24 are pressed against the upper side of the web 10 by the strap 18 which extends parallel to the tubes 30 and bears on the flanges 26 on the upper side of the core. A pair of locating ribs 32 on the upper side of the web straddle one of the flanges 26 to positively locate the core relative to the opening 12.

The anchor apertures 16 are the same shape so that the strap 18 can be installed in either direction. Each aperture 16 is generally rectangular and has downwardly extending flanges 34 and 35 on the respective aperture sides nearest and farthest from the opening 12. Each aperture 16 has a vertical inner wall 36 nearest the opening 12 with a chamfer 38 at the upper edge, and an inwardly inclined wall 40 furthest from the opening 12. The lateral sides of the apertures 16 are bounded by walls 42 depending from the lower surface of the web as shown in FIG. 4. The walls 42 have the function of reducing air flow through the aperture containing the end portion 23.

The mounting strap 18 has one end portion 22 which is shaped as an outwardly turned hook. The end portion 22 has a vertical run 44 extending through the aperture 16 and connected to a straight horizontal portion 46 for engaging the under side of the flange 35, and terminates in a tab 48 turned up at an angle from the portion 46. To install the hook in the aperture, the strap 18 is maneuvered with the straight section 19 approximately normal to the web so that the portion 46 can be inserted into the aperture, and after such insertion the strap is turned toward its installed position to fasten the hook in the aperture. For removal the procedure is reversed.

The other end of the strap has an end portion 23 which comprises a snap fastener. It comprises a vertical run 50 which extends through the aperture for contact with the vertical inner wall 36, a portion 52 bent upward and outward extending to the lower surface of the flange 35, an inturned approximately horizontal shoulder 54 for contact with the under side of the flange 35, and an upward and outward angled release lever 56 parallel to the inclined wall 40 and extending out through the aperture far enough for convenient manual operation. By pushing the end portion 23 into the aperture 16 the portion 52 is forced toward the vertical run 50 and when fully inserted the portion 52 snaps out and the shoulder 54 latches against the bottom of the flange 35. By pushing the release lever 56 toward the vertical run 50 the shoulder 54 is released from the flange and the end portion can be removed from the aperture.

A second embodiment of the invention, as depicted in FIG. 5, comprises a spring steel strap 60 having a V-shaped cross section straight section 62 with curved flex sections 64 on either end and terminating in identical hook portions 66. The hook portions comprise substantially vertical straight runs 68 ending in simple curved hooks 70 which are bent outward and upward. The curved flex sections 64 each have a curve extending from the straight section 62, rising higher than the straight section and then tangentially connect to the straight run 68. The hook portions 66 each have a free position shown in phantom lines as 66'. The heater core 14 is the same as that in the first embodiment. The web 72 of the case has an opening defined by a transverse duct 74 which carries an air stream which passes through the core 14. Web flanges 76 are formed by extensions of the duct 74 beyond the plane of the web 72 and are situated to engage each header flange 26 for positioning the core on the web.

Anchor apertures 80 in the web and outboard of the core ends each have a downturned lip 82 or flange on the outboard side of the aperture 80 for engagement by a hook 70 of the strap. A V-shaped contour 84 protruding upward on the web outboard of and adjacent to each lip 82 forms a slope 86 extending down to the edge of the aperture to assist in guiding the hooks into the apertures 80 during strap installation.

To install the strap 60, it is positioned on the core 14 with the straight section 62 in contact with the header flanges 26 and the hook portions 66 are manually pushed inward and down into the apertures, guided by the slopes 86, and released to allow the hooks 70 engage the lips 82 as shown in solid lines. The spring force of the curved flex sections 64 hold the hooks 70 tightly against the lips 82 and at the same time hold the core against the web. To remove the strap for servicing of the core, the hook portions are manipulated by pressing in and down on the flex sections to remove the hooks 70 from the lips 82 and then pulling straight up to extract the hooks from the apertures 80.

Thus for either embodiment no tools are required for assembly and removal and only one strap and no screws are needed to secure the core to the web.

The embodiments of the invention in which an exclusive property or privilege is claimed are defined as follows:

1. In an air conditioning and heating system, apparatus for mounting a heater core comprising:
    a web for supporting a heater core, the web defining a passage for air flow through the core and further defining a pair of anchor means on opposite side of the passage; and
    an elongated spring steel strap secured to the anchor means for spanning the heater core and holding the heater core against the web, the strap having on each end a flexed arcuate portion terminating in hook means for engaging the anchor means, whereby the flexed arcuate portions urge the strap against the heater core.

2. The invention as defined in claim 1 wherein each anchor means comprises an aperture in the web and an outstanding flange adjacent the aperture for engagement by the hook means.

3. The invention as defined in claim 2 wherein the apertures in the web have the same shape.

4. The invention as defined in claim 1 wherein the anchor means are apertures in the web, the hook means on one end is a crook which hooks into one of the apertures and the hook means on the other end is a resilient snap fastener which is pushed into the other of the apertures to fasten the strap to the web.

5. The invention as defined in claim 4 wherein the snap fastener comprises a resiliently biased shoulder portion which engages the web adjacent the aperture and an integral release lever on the shoulder portion which extends out of the aperture whereby the snap fastener can be manually removed from the aperture by operating the release lever.

6. The invention as defined in claim 1 wherein each anchor means comprises an aperture in the web and an outstanding flange adjacent the aperture for engagement by the hook means; and
    each hook means comprises an outwardly turned hook for engaging a flange and biased into engagement with the flange by the flexed arcuate portion.

7. The invention as defined in claim 1 wherein the strap between the flexed arcuate portions is straight and has a V-shaped cross section for rigidity.

8. The invention as defined in claim 1 wherein the web includes locating rib means for positively positioning the core on the web.

* * * * *